Oct. 28, 1958 — R. K. GARRITY — 2,857,973
INSECT AND DEBRIS DEFLECTOR
Filed July 3, 1956
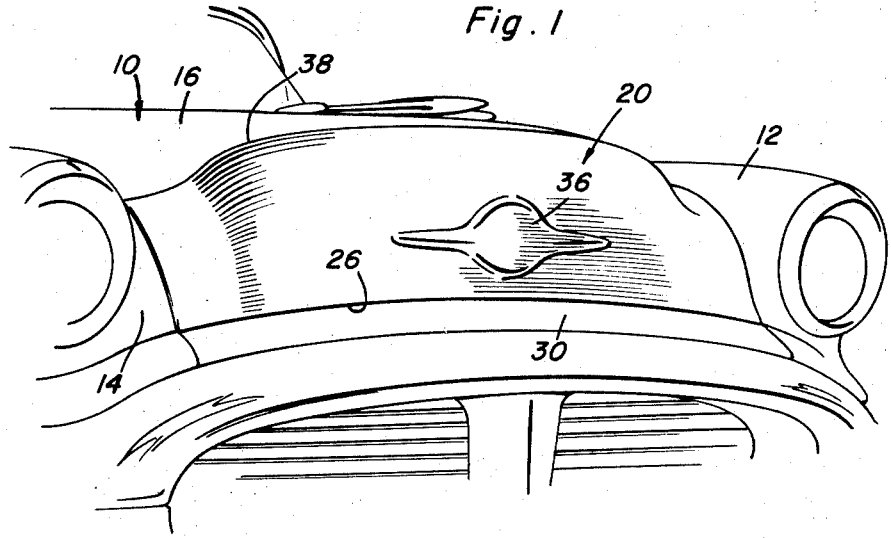
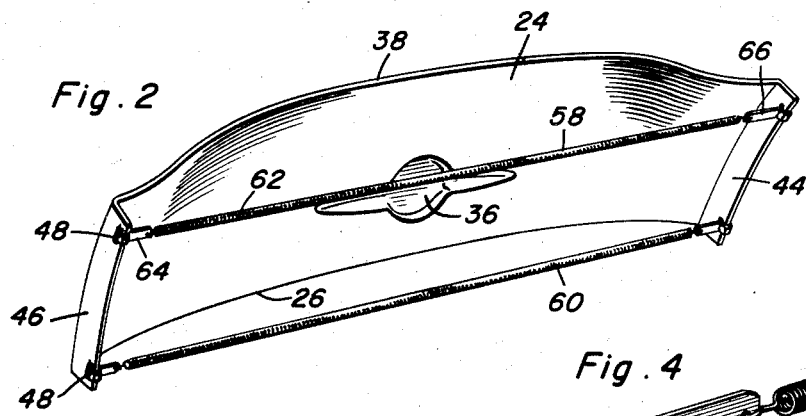
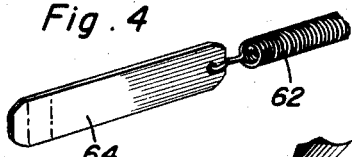
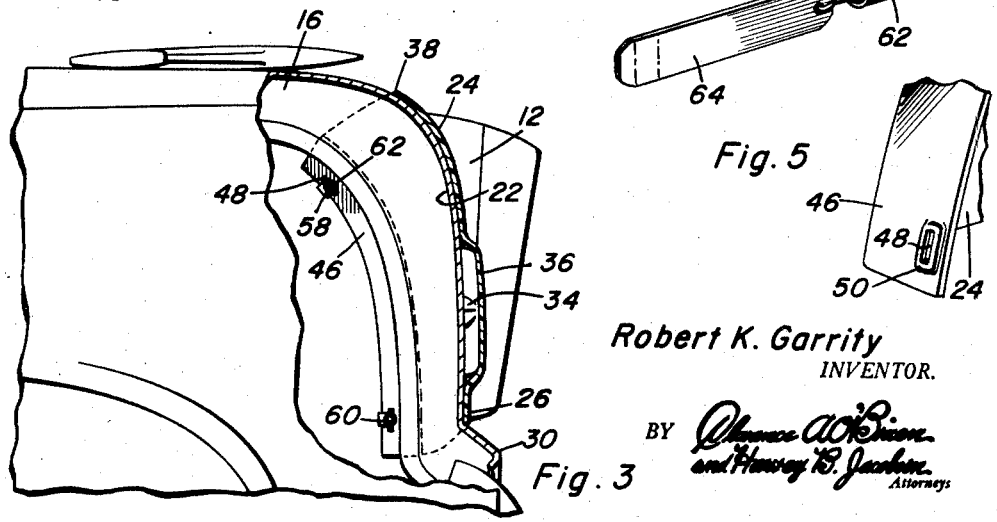
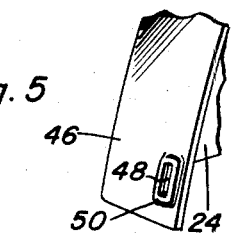
Robert K. Garrity
INVENTOR.

United States Patent Office 2,857,973
Patented Oct. 28, 1958

2,857,973

INSECT AND DEBRIS DEFLECTOR

Robert K. Garrity, Omaha, Nebr.

Application July 3, 1956, Serial No. 595,748

2 Claims. (Cl. 180—69)

This invention relates to attachments for motor vehicles and more particularly to an insect and debris deflector that is adapted to be mounted over the front surface of the hood of a modern motor vehicle.

An object of the present invention is to provide a mechanically simplified insect and debris deflector which is adapted to fit over the front surface of the hood of a motor vehicle, this surface being exposed to bombardment by insects and debris while the motor vehicle is in normal operation.

A further and more specific object of the present invention is to provide a deflector which is designed especially to fit the contours of the front surface of the hood of a modern motor vehicle and which has flanges at the side edges thereof which fit between the side edges of the hood and the confronting edges of the fenders adjacent to the hood, thereby serving the secondary function of an anti-rattle and anti-squeak device.

A further object of the invention is to provide an insect and debris deflector which fits exclusively on the front surface of the hood of a motor vehicle; that is, being separate from the fender areas adjacent to the hood and extending upwardly to an elevation below the top surface of the hood whereby the deflector is not visible from the interior of the motor vehicle and provides a protector for the finish of the motor vehicle which is hardly discernible from the finish of the motor vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a part of a motor vehicle having an insect and debris deflector exemplifying the invention applied thereon;

Figure 2 is a rear perspective view of the deflector in Figure 1;

Figure 3 is a side view of a part of the motor vehicle, portions of the vehicle being broken away in section in order to illustrate the mounting of the deflector on the motor vehicle;

Figure 4 is a fragmentary perspective view of the means for attaching the deflector onto the motor vehicle hood;

Figure 5 is a fragmentary perspective view showing a corner of the deflector.

In the accompanying drawing there is a fragmentary part of a motor vehicle 10 to show the principal use of the invention. The illustration has the front fenders 12 and 14 with hood 16 located therebetween. Hood 16 for the motor vehicle has flanges along the side edges which are adapted to fit between flanges on the confronting edges of the fenders 12 and 14. Usually, rubber or plastic bumpers are applied between the mating flanges on the hood and fenders.

Debris and insect deflector 20 is adapted to fit over the front surface 22 of hood 16 in order to protect the finish of the hood from becoming damaged by the constant bombardment of insects and debris during normal operation of the motor vehicle. It is preferred that the deflector be made of a commercial plastic material, for example, a butyrate, vinyl or others. Structurally, the deflector comprises panel 24 having a lower edge 26 following generally the curvature of the lower edge of hood 16. For motor vehicles whose hoods have an acutely bent lower edge, as at 30 (Figure 3), the lower edge 26 of the deflector may be spaced from the extremity of the hood, but should be curved to fit a molding, a contour or a convenient reference line at or adjacent to the lower edge of the hood. Panel 24 is preformed to fit the precise contours of the hood, and this may be accomplished in several ways, one of which is by molding the plastic in the specific shape desired and another of which is by pressing the plastic panel into shape.

The hood ornament 34 of the motor vehicle may be detached and the panel fitted thereunder. Then, the hood ornament could be returned to the motor vehicle hood. As an alternative, a pocket 36 may be formed in the panel 24, this pocket snugly accommodating the hood ornament 34.

The upper edge 38 of panel 24 preferably terminates on the front surface of hood 16 at a point slightly below the line of vision of the motorist and passengers. In this way, there is no obstruction to vision and no violation of any of the numerous local ordinances and rules which regulate what may be attached to a motor vehicle in the line of vision of the motorist.

There are means operatively connected with panel 24 in order to hold the deflector fastened firmly in place on the motor vehicle. These means consist of two flanges 44 and 46, respectively, which extend along the side edges of panel 24. The flanges are of sufficient size to pass between the confronting flanges of hood 16 and the fenders 12 and 14 in order to expose apertures 48 on the inside of the hood. The apertures 48 are preferably slots that are formed in a reinforced part 50 of the flanges. Alternatively, the entire flanges 46 and 44 may be reinforced. This is not an essential, but is an alternative procedure.

By having the flanges 44 and 46 pass between the hood and fender edges, they function as anti-rattling and -squeak devices should any be necessary. As shown in Figure 3, the innermost parts of the flanges 44 and 46 extend beneath the hood sufficiently far to accommodate the fastening devices 58 and 60. Although these devices are shown attached to opposed slots in flanges 44 and 46, this is not to be interpreted as the only manner of attachment of the deflector onto the hood, nor is this intended to be interpreted as the best manner of attachment of the deflector. The fastening devices 58 and 60 each consists of a spring 62 having clips 64 and 66 at the opposite extremities thereof. One clip is adapted to be bent at its end through one of the slots 48, while the other may be bent through the opposed slot in the opposite flange or may be attached to any of the braces beneath the hood or any other part considered convenient by the motor vehicle owner. One method of attachment would be to utilize the two fastening devices 58 and 60 as shown in Figures 2 and 3, but others may be adopted.

Any color and shade, such as those to match substantially identically the manufacturer's colors, may be adopted. As an alternative, a transparent plastic may be used, this being more universal and probably more acceptable in view of the reduction in inventory that would be involved in stocking the insect and debris deflector.

In use, the deflector is applied to the motor vehicle hood in the manner previously described. It remains thereon during operation of the motor vehicle and protects the finish of the hood against damage, the front part of the hood being an unusually vulnerable area for deterioration caused by insect and debris, as sand, bombardment.

What is claimed as new is as follows:

1. An attachment for the front surface of a motor vehicle hood that closes between a pair of front fenders, said attachment comprising a panel of a fixed shape and dimensioned to fit exclusively over the front surface of the hood, means at opposite edges of said panel for fastening said panel to said hood and including a pair of flanges to be fitted between the side edges of said hood and said fenders and thereby providing an anti-rattle and anti-squeak device, said flanges extending along substantially the entire side edges of said panel and having apertures, and means in the apertures in both of said flanges and extending across the back part of said panel and adapted to extend behind the motor vehicle hood for anchoring said panel on the hood.

2. An attachment for the front surface of a motor vehicle hood that closes between a pair of front fenders, said attachment comprising a one piece panel of fixed shape and dimensioned as to fit exclusively over the front surface of the hood, means at opposite side edges of said panel for fastening said panel to said hood and including a pair of flanges to be fitted between the side edges of said hood and said fenders and thereby providing an anti-rattle and anti-squeak device for the hood, said flanges having apertures, reinforced areas in said flanges in which said apertures are formed, springs, and a clip at each end of each spring, the clips on each spring engaged in said apertures.

References Cited in the file of this patent

UNITED STATES PATENTS

| | | |
|---|---|---|
| 2,048,461 | Mosgoffian | July 21, 1936 |
| 2,589,901 | Van Doren | Mar. 18, 1952 |
| 2,623,481 | Muciaccia et al. | Dec. 30, 1952 |
| 2,793,705 | Garrity | May 28, 1957 |